United States Patent [19]

Fukuzawa et al.

[11] 4,041,319
[45] Aug. 9, 1977

[54] RADIOGRAPHIC PHOSPHOR SCREEN

[75] Inventors: Tadashi Fukuzawa, Tokyo; Teruki Suzuki, Funabashi; Shigeru Sato, Matsudo, all of Japan

[73] Assignees: Hitachi, Ltd.; Hitachi Medical Corporation, both of Japan

[21] Appl. No.: 670,833

[22] Filed: Mar. 26, 1976

[30] Foreign Application Priority Data

Mar. 26, 1975 Japan .................................. 50-35537

[51] Int. Cl.$^2$ ............................................. G01J 1/58
[52] U.S. Cl. ................................. 250/460; 250/483; 252/301.4 P
[58] Field of Search ............................. 250/460, 483; 252/301.4 P

[56] References Cited

U.S. PATENT DOCUMENTS

| 3,647,706 | 3/1972 | Lagos | 252/301.4 P |
| 3,789,014 | 1/1974 | Graff et al. | 252/301.4 P |
| 3,795,814 | 5/1974 | Rabatin | 250/460 |

Primary Examiner—Harold A. Dixon
Attorney, Agent, or Firm—Craig & Antonelli

[57] ABSTRACT

A radiographic phosphor screen to be used as an intensifying screen, a direct viewing fluorescent screen, an input screen of an image intensifier tube for radiography and the like, which comprises a substrate and, supported thereon, a phosphor represented by the following general formula:

$$M(P_x, V_{1-x})O_4$$

wherein M stands for at least one element selected from the group consisting of yttrium (Y), lanthanum (La), gadolium (Gd) and lutetium (Lu) and $x$ is a number of from 0.7 to 0.99, or a phosphate formed by activating said phosphor with 0.01 to 0.5 mole % of thulium (Tm).

22 Claims, 9 Drawing Figures

RADIOGRAPHIC PHOSPHOR SCREEN

BACKGROUND OF THE INVENTION

The present invention relates to a radiographic phosphor screen to be used as an intensifying screen, a direct viewing fluorescent screen, photofluorographic screen and an input screen of an image intensifier tube for X-ray or radioisotope, or to be used for nondestructive inspection of metal articles or for metal article detectors.

In the medical science, radiology using X-rays or γ-rays has made rapid and drastic progress, and various radiographic apparatuses for the medical diagnostic system have been developed in succession. In these apparatuses, radiophosphor screens are used for converting X-rays and γ-rays to visible rays and/or ultraviolet rays. In the medical diagnosis using radioactive rays, especially when radioactive rays are applied to human bodies, it is necessary to reduce dosages of radioactive rays for safety.

Calcium tungstate ($CaWO_4$) and terbium-activated lanthanoid oxisulfide phosphors have heretofore been used for conventional radiographic screens. In these phosphors, the overall efficiency depends on a lot of factors, such as the X-ray absorption efficiency, the efficiency of conversion of absorbed X-ray energy to light energy and the matching of the emission spectrum of the phosphor with the spectral sensitivity of the detector. The second efficiency is relatively low in calcium tungstate phosphors and the third efficiency is comparatively low in terbium-activated lanthanoid oxisulfide phosphors in the case of usual blue-sensitive medical X-ray films.

SUMMARY OF THE INVENTION

It is an object of the present invention to provide a radiographic phosphor screen having a high sensitivity.

Another object of the present invention is to provide a radiographic phosphor screen having a good matching of the emission spectrum with the spectral sensitivity of a medical radiographic film.

These and other objects of the present invention will be apparent from the detailed description given hereinafter.

The radiographic phosphor screen of the present invention comprises a substrate and, supported thereon, a phosphor-vanadate phosphor represented by the following general formula:

$$M(P_x, V_{1-x})O_4$$

wherein M is at least one element selected from the group consisting of Y, La, Lu and Gd and $x$ is a number of from 0.7 to 0.99.

An activated phosphor comprising the above phosphor and, incorporated therein, 0.01 to 0.5 mole % of thulium (Tm) as an activator may also be used as the phosphor in the radiographic phosphor screen of the present invention.

As the substrate, any of X-ray permeating materials used for conventional radiographic phosphor screens, such as paper, plastic film-coated papers, plastic films, glass plates, aluminum plates and beryllium plates, can be used in the present invention.

All X-ray phosphor screens have heretofore been, in principle, prepared by applying a suspension comprising a phosphor powder and a binder onto a paper or metallic substrate, followed by drying. The substrates of these phosphor screens may have reflective coating for light.

Also in the present invention, a dispersion of the above phosphor in a binder is coated in a thickness of about 0.1 mm on a substrate such as a paper or a plastic film, for example, a polyester film having a thickness of 1 mm. The thickness of the phosphor layer or substrate is varied depending on the intended use and other factors. If necessary, a thin plastic film is formed on the phosphor screen in order to prevent permeation of moisture and contamination. In some cases, it is necessary that a specific grain size distribution should be maintained in phosphor particles.

The phosphor screen of the present invention is especially suitable for converting radioactive rays of 0.01 to 10 MeV to visible rays and/or ultraviolet rays.

DETAILED DESCRIPTION OF THE PREFERRED EMBODIMENTS

The phosphor that is used in the present invention is represented by the following general formula:

$$M(P_x, V_{1-x})O_4$$

wherein M stands for at least one element selected from the group consisting of Y, La, Gd and Lu, and $x$ is a number of from 0.7 to 0.99.

In the above general formula, M is preferably at least one element selected from the group consisting of Y, Gd and Lu. Lu is most preferred as the element M.

It is preferred that in the above general formula, $x$ be a number of from 0.75 to 0.95.

Figure 1:
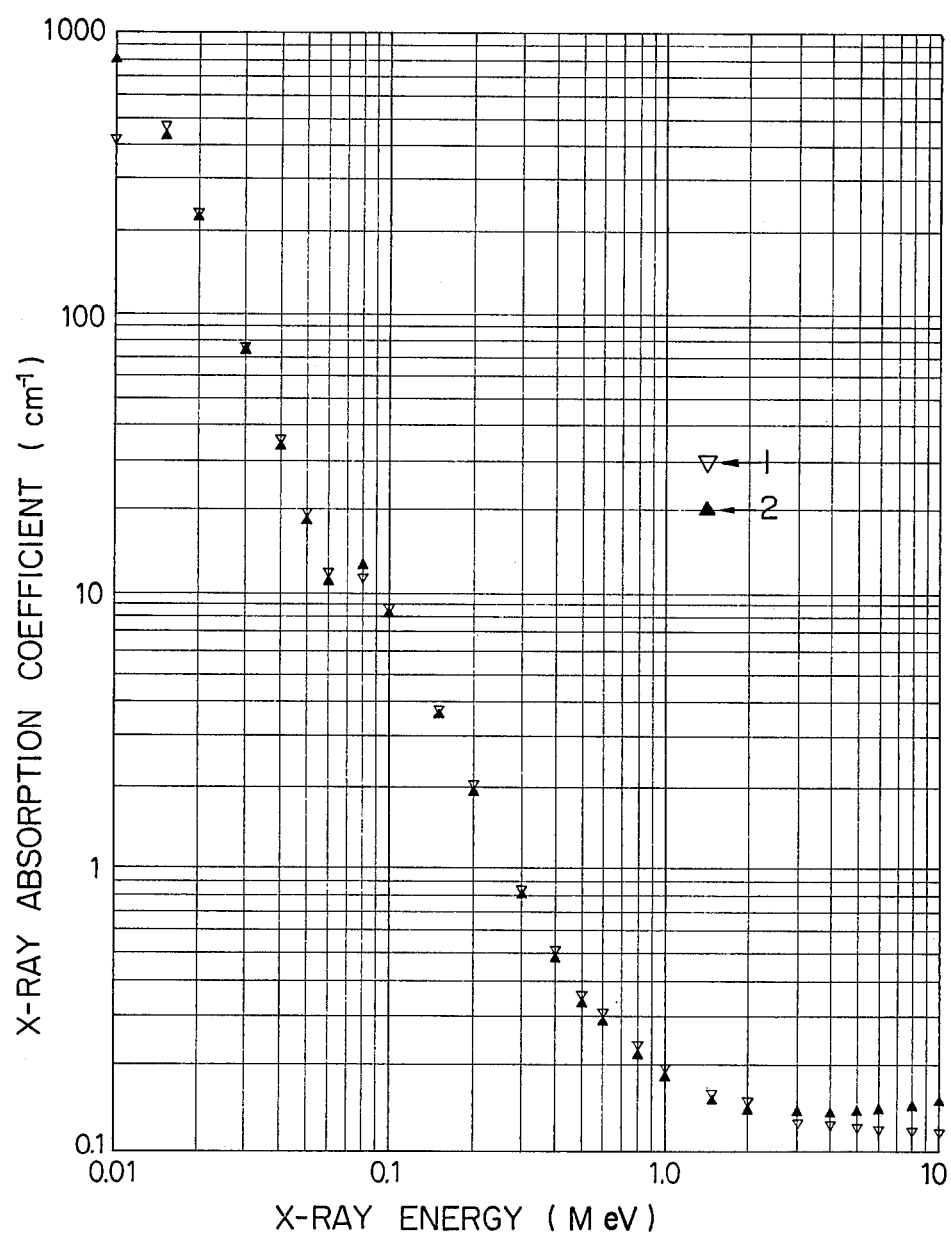
FIG. 1 is a diagram showing the relation between the X-ray absorption coefficients of phosphors and the X-ray energy.

$Lu(P_{0.80}, V_{0.20})O_4$, which is an example of phosphors to be used in the present invention, will now be compared with the conventional $CaWO_4$ phosphor with respect to the dependence on X-ray energy by reference to FIG. 1.

In FIG. 1, when the X-ray absorption coefficients of the Lu($P_{0.80}$, $V_{0.20}$)$O_4$ phosphor indicated by curve 2 are compared with those of the $CaWO_4$ phosphor indicated by curve 1, it is seen that both the phosphors have equivalent absorption coefficients within a range of 0.01 to 2.0 MeV, but in a high energy region of 2.0 to 10 MeV, the Lu($P_{0.80}$, $V_{0.20}$)$O_4$ phosphor has higher absorption coefficients than those of the $CaWO_4$ phosphor.

Figure 2:
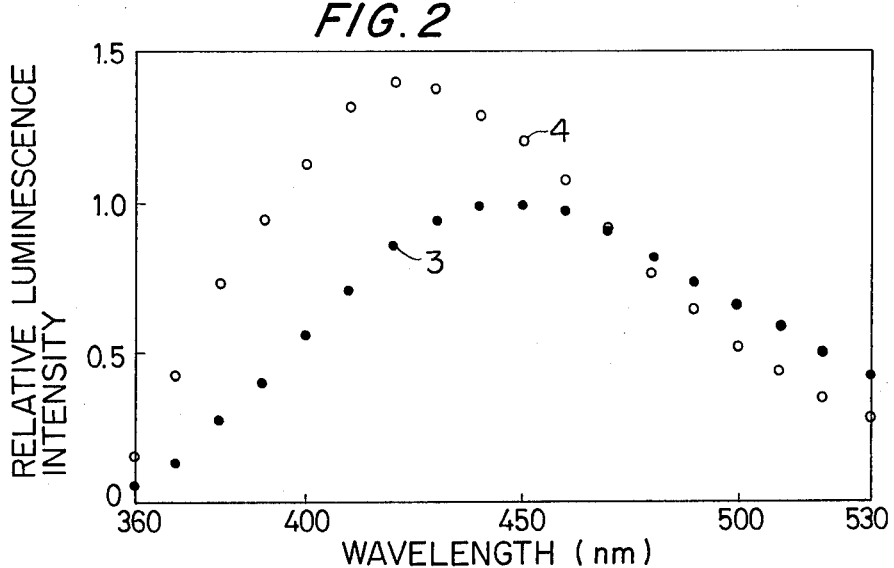
FIG. 2 is a diagram showing the typical emission spectra of calcium tungstate and lutetium phosphovanadate.
Figure 9:
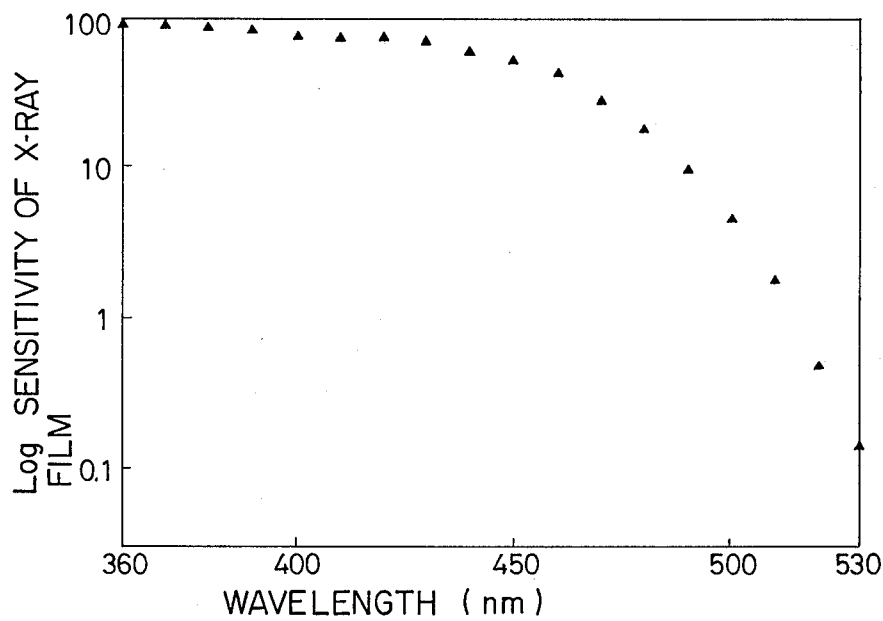
FIG. 9 is a diagram illustrating the spectral sensitivity of an X-ray film.

FIG. 2 illustrates emission spectra of the Lu($P_{0.85}$, $V_{0.15}$)$O_4$ phosphor used in the present invention and the conventional $CaWO_4$ phosphor, observed when excited under the same conditions. At the maximum wavelength value, the emission spectrum 4 of the Lu($P_{0.85}$, $V_{0.15}$)$O_4$ phosphor has a luminescence intensity 1.4 times as high as that of the emission spectrum 3 of the $CaWO_4$ phosphor. Further, it is seen that peaks of the emission spectrum 4 are shifted to the wavelength side as compared with the emission spectrum of the $CaWO_4$, phosphor and that the emission of the Lu($P_{0.85}$, $V_{0.15}$)$O_4$ matches well to the photographic response of an X-ray film shown in FIG. 9 and it can be exposed more effectively.

FIGS. 3 to 6 show results of tests conducted by using as intensifying screens formed by coating phosphors on plastic coated papers according to a known method. The intensifying screen was used was closely contacted with a commercially available X-ray film and the assembly was placed in a cassette. These facilities were operated under the conditions normally used for usual X-ray radiographic examinations (45 k$V_p$ to 120 k$V_p$). A 20 mm thick aluminum plate was used as a phantom at the source, and a stationary grid was used to reduce the effects of scattered radiation.

No aluminum plate was used when the source voltage was 30 k$V_p$.

Multiple exposures at different levels were made and films were processed under the conditions normally used to obtain medical radiographs. The optical densities of the film were measured and the relative exposure factors were calculated through emulsion calibration curves obtained for the same films. The optical density of the $CaWO_4$ phosphor (obtained from the National Bureau of Standards, Sample No. 1026) was used as a standard (ration 1) in all cases.

Figure 3:
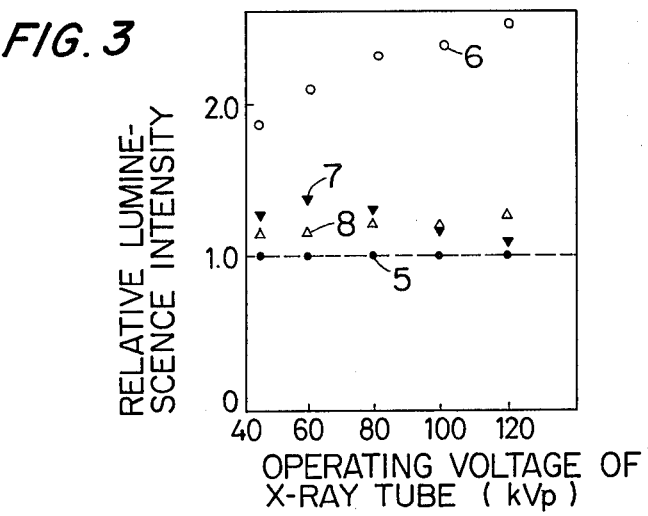
FIG. 3 is a diagram illustrating the dependences of the relative luminescence intensities of phosphovanadate phosphor [$M(P_x, V_{1-x})O_4$] and calcium tungstate on the operating voltage ($kV_p$) of an X-ray tube.

FIG. 3 illustrates changes of the relative emission intensity in M($P_x$, $V_{1-x}$)$O_4$ phosphors observed when the voltages of the X-ray tube are changed. In the case of Lu($P_{0.8}$, $V_{0.2}$)$O_4$ indicated by curve 6, the sensitivity is about 2.53 times as high as the sensitivity of the $CaWO_4$ phosphor at a source voltage of 120 k$V_P$.

Figure 4:
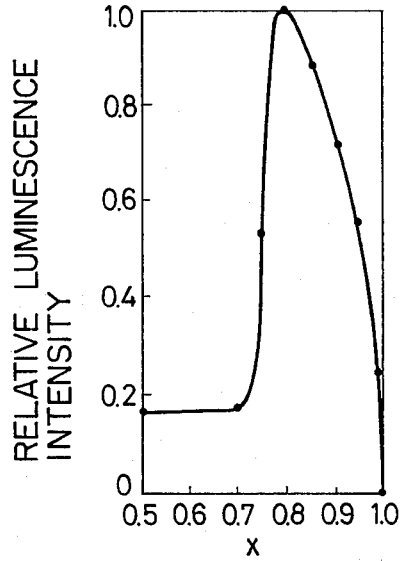
FIG. 4 is a diagram illustrating the dependence of the relative luminescence intensity of phosphovanadate phosphor [$Lu(P_x, V_{1-x})O_4$] on the value $x$ in $Lu(P_x, V_{1-x})O_4$.

FIG. 4 illustrates changes of the luminescence intensity in Lu($P_x$, $V_{1-x}$)$O_4$ phosphors observed when the ratio of the phosphate ion to the vanadate ion is changed. In FIG. 4, $x$ denotes the mole fraction of the phosphate. It is seen that when the vanadate as the luminescence center is contained at a ratio of 20 mole %, namely when $x$ is 0.8, the relative intensity is highest, and the relative intensity is high when $x$ is from 0.7 to 0.99, especially from 0.75 to 0.95.

In order to compare the phosphors of the present invention with conventional lanthanoid phosphates, the following experiments were conducted.

Since lanthanoid phosphates cannot sensitize X-ray films, trivalent thulium was added as an activator to Lu($P_x$, $V_{1-x}$)$O_4$, and the measurement of the relative luminescence intensity was conducted on these phosphors inclusive of the phosphor in which $x$ was 1.

Figure 5:
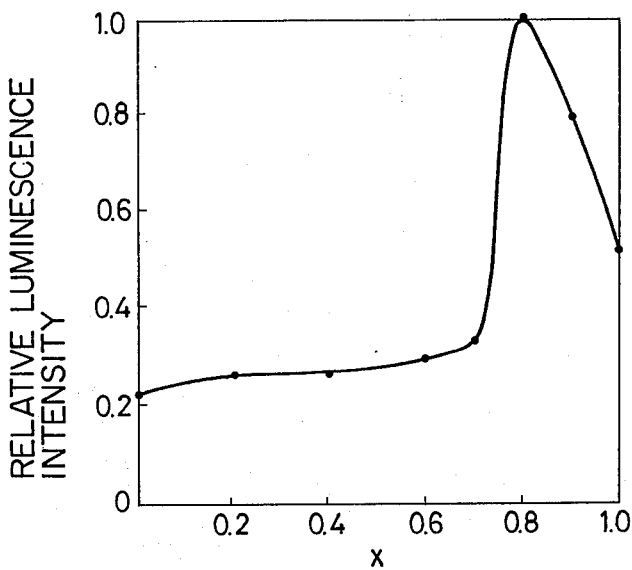
FIG. 5 is a diagram illustrating the dependence of the relative luminescence intensity of $Tm^{3+}$-activated phospho-vanadate phosphor [$Lu(P_x, V_{1-x})O_4$] on the value $x$ in $Lu(P_x, V_{1-x})O_4$.

FIG. 5 illustrates the dependence of the luminescence intensity on the value $x$ in Lu($P_x$, $V_{1-x}$)$O_4$:Tm. It is seen that the luminescence intensity of the phosphor containing 20% of the vanadate is 2 times as high as the luminescence intensity of the phosphor in which $x$ is 1, namely the conventional vanadate-free phosphor. Thus, it will readily be understood that addition of the vanadate is effective.

Advantages attained by phosphors including a plurality of cations will now be described.

Figure 6:
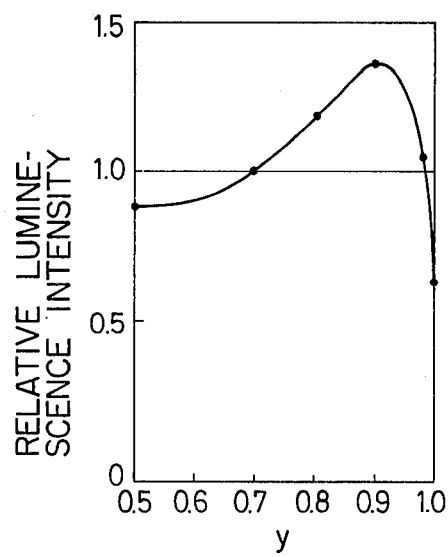
FIG. 6 is a diagram illustrating the dependence of the relative luminescence intensity of phosphovanadate phosphor [$Y_yGd_{1-y}(P_{0.85}, V_{0.15})O_4$] on the value $y$ in $Y_yGd_{1-y}(P_{0.85}, V_{0.15})O_4$.

FIG. 6 illustrates the relation between the value $y$ and the luminescence intensity in $Y_y Gd_{1-y}$($P_{0.85}$, $V_{0.15}$)$O_4$ (in FIG. 6, the luminescence intensity of the phosphor in which $y$ is 0.7 is expressed as 1). The luminescence intensity of a phosphor of a mixed crystal system of Y and Gd is more than 2 times the luminescence intensity of the phosphor containing only Y as the cation. The luminescence intensity of the phosphor containing Gd alone is lower than that of the phosphor containing Y alone. One of causes of increase of the luminescence intensity is considered to be that since K absorption edges are deviated in these cations, the energy escaping out of the phosphor as the characteristic X-rays is effectively utilized.

The following Examples are given for further illustration of the present invention but not for limiting the scope of the invention. As will be apparent from these Examples, when an X-ray detector or image intensifier tube is constructed by using the radiographic phosphor screen and a bialkali, which is most excellent in the quantum efficiency and radiant sensitivity among now generally used photocathodes, is used as the photocathode of the image intensifier tube, the spectral response characteristics of the photocathode are well in agreement with the emission spectra of the phosphovanadate phosphor and radiographic phosphor screen of the present invention.

EXAMPLE 1

Self-activated blue phosphors represented by the formula Lu($P_x$, $V_{1-x}$)$O_4$ (0.7 ≤ $x$ ≤ 0.99) were prepared by a method stated below.

For example, the following three raw materials were mixed together sufficiently to form 100 g of the starting charge for obtaining a phosphor compound in which $x$ was 0.8:

lutetium oxide ($Lu_2O_3$): 57.8 g
diammonium hydrogen phosphate [($NH_4$)$_2HPO_4$]: 33.7 g
vanadium pentoxide ($V_2O_5$): 5.8 g Then, hydroscopic sodium carbonate ($Na_2CO_3$) was added to the mixture. The resultant mixture was mixed again, charged into an opaque quartz crucible or alumina crucible, pre-fired at about 800° C. for 30 minutes and then fired at 1250° C. for 3 hours in an air atmosphere in the semiclosed state.

Then, in order to remove excessive vanadium, the resulting fired mixture was crushed and water was poured thereon. After it had been allowed to stand still for a suitable period of time, the mixture was passed through a 250 mesh sieve the mixture having passed through the sieve was allowed to stand still and then, a supernatant liquid was taken away. The remaining precipitate was carefully washed three times with an aqueous solution containing 2% by weight of ammonium carbonate [($NH_4$)$_2CO_3$], and it was finally washed with water. The washed precipitate was dried at 200° C. for 24 hours.

Thus was obtained a pure-white phosphor [ Lu(P$_{0.8}$, V$_{0.2}$)O$_4$]. This phosphor was coated on a plastic coated paper according to a known customary method to prepare a phosphor screen. This screen and a comparative phosphor screen including a calcium tungstate phosphor (NBS 1026 ) were tested under X-ray excitation of a source voltage of 120 kV$_p$. It was found that the screen obtained in this Example has a sensitivity about 2.5 times the sensitivity of the comparative screen.

The foregoing procedures were repeated while changing the mole ratio of the phosphate and vanadate, namely the value $x$, to obtain results shown in FIG. 4.

EXAMPLE 2

57.5 g of lutetium oxide, 0.3 g of thulium oxide, 33.7 g of secondary ammonium phosphate, 5.8 g of vanadium pentoxide and 2.7 g of sodium carbonate were mixed together sufficiently, and the mixture was charged in a quartz or alumina crucible, pre-fired at about 800° C. for 30 minutes and fired at 1250° C. for 3 hours in an oxidative atmosphere. The fired mixture was pulverized, washed three times with an aqueous solution containing 2% by weight of ammonium carbonate and then washed with sufficiently. A phosphor screen prepared by using the so obtained phosphor [Lu$_{0.995}$Tm$_{0.005}$(P$_{0.8}$, V$_{0.2}$)O$_4$] and a comparative phosphor screen prepared by using calcium tungstate (NBS 1026) were tested under X-ray excitation of a source voltage of 100 kV$_p$. It was found that the phosphor screen prepared in this Example had a sensitivity about 1.3 times the sensitivity of the comparative screen.

The foregoing procedures were repeated while changing the mole ratio of the phosphate vanadate, namely the value $x$, to obtain results shown in FIG. 5.

EXAMPLE 3

32.9 g of yttrium oxide, 13.2 g of gadolinium oxide, 45.0 g of secondary ammonium phosphate, 5.5 g of vanadium pentoxide and 3.4 g sodium carbonate were mixed together sufficiently, and the mixture was charged in a quartz or alumina crucible, pre-fired at about 800° C. for 30 minutes and fired at 1250° C. in an oxidative atmosphere. Then, the fired mixture was pulverized, washed three times with an aqueous solution of ammonium carbonate and then washed with water sufficiently. The resulting phosphor was dried at 200° C. for 24 hours. A phosphor screen prepared by using the so synthesized phosphor [Y$_{0.8}$Gd$_{0.2}$(P$_{0.85}$, V$_{0.15}$)O$_4$] and a comparative phosphor screen prepared by using calcium tungstate (NBS 1026) were tested under X-ray excitation of a source voltage of 60 kV$_p$. It was found that the phosphor screen prepared in this Example had a sensitivity about 1.2 times the sensitivity of the comparative screen.

The foregoing procedures were repeated while changing the ratio between Y and Gd, namely the value $y$, to obtain results shown in FIG. 6, from which it will readily be understood that the phosphor including a plurality of cations has a sensitivity higher than the phosphor including the single cation.

EXAMPLE 4

Figure 7:
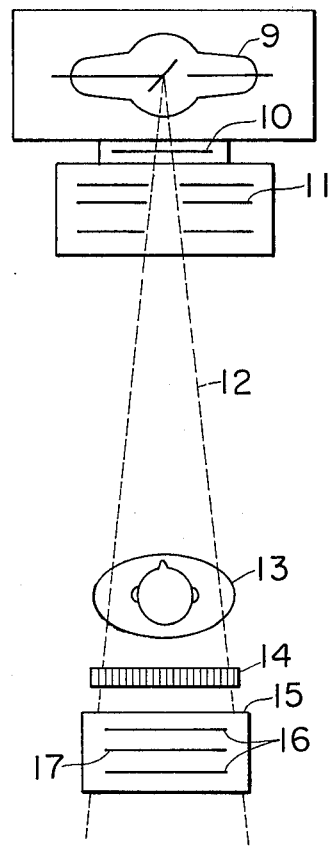
FIG. 7 is a conceptional diagram illustrating the structure of an X-ray detector including the radio radiographic phosphor screen of the present invention.

An intensifying screen prepared by using the Lu(P$_{0.8}$, V$_{0.2}$)O$_4$ phosphor synthesized according to the method described in Example 1 was combined with an apparatus normally used for chest X-ray radiographic examinations including an X-ray excitation source 9 of a source voltage of 120 kV$_p$ as shown in FIG. 7. The X-ray dosage could be reduced to about 40% of the X-ray dosage necessary when an intensifying screen prepared by using calcium tungstate was combined with the above apparatus. In FIG. 7, reference numerals 10, 11, 12, 13, 14 and 15 denote a filter, multi-irises, an X-ray beam path, an object to be measured, a lead grid and a cassette, respectively. X-ray film 17 sandwiched with a couple of intensifying screen 16 of the present invention is charged in cassette 15.

EXAMPLE 5

Figure 8:
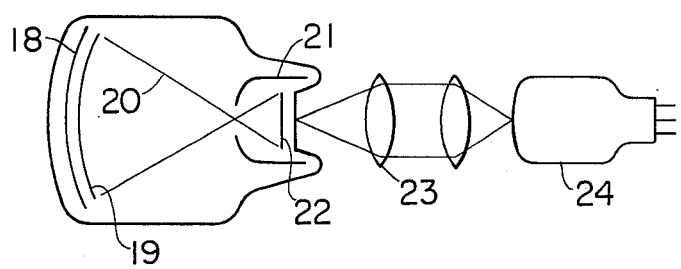
FIG. 8 is a conceptional diagram illustrating an X-ray image intensifier tube including the radiographic phosphor screen of the present invention.

FIG. 8 illustrates an embodiment of a radiographic phosphor screen formed by attaching the phosphor synthesized by the method disclosed in Example 1 to the front panel of an X-ray image intensifier tube. In FIG. 8, reference numeral 18 denotes an input scintillator acting as the radiographic phosphor screen of the present invention where diagnostic X-rays are converted to visible rays, and the visible rays are applied to a subsequent photocathode 19 to generate photo-electrons. A copper-activated zinc sulfide phosphor (RNA No. P31) having a high luminescence under electron beam excitation is used for output phosphor screen 22.

By using the radiographic screen of this Example, the X-ray dosage could be drastically reduced as in the foregoing Examples.

In FIG. 8, reference numerals 20, 21, 23 and 24 denote an electron beam ray, a grid for focussing electron beams, an optical collimator and a TV camera, respectively.

What is claimed is:

1. A radiographic phosphor screen comprising a substrate and, supported thereon, a phospho-vanadate phosphor represented by the following general formula:

wherein M stands for at least one element selected from the group consisting of Y, La, Lu and Gd, and $x$ is a number of from 0.7 to 0.99.

2. A radiographic phosphor screen as set forth in claim 1 wherein M in the general formula is at least one element selected from the group consisting of Y, Lu and Gd.

3. A radiographic phosphor screen as set forth in claim 1 wherein M in the general formula is Lu.

4. A radiographic phosphor screen as set forth in claim 1 wherein $x$ in the general formula is a number of from 0.75 to 0.95.

5. A radiographic phosphor screen as set forth in claim 1 wherein the substrate is at least one member selected from the group consisting of plastic films, plastic film-coated papers, glass plates, aluminum plates, beryllium plates, and a combination of two or more of the foregoing materials.

6. A radiographic phosphor screen comprising a substrate and, supported thereon, a phospho-vanadate phosphor represented by the following general formula:

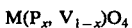

wherein M stands for at least one element selected from the group consisting of Y, La, Lu and Gd, and $x$ is a number of from 0.7 to 0.99, said phospho-vanadate phosphor being activated with 0.01 to 0.5 mole % of thulium as an activator.

7. A radiographic phosphor screen as set forth in claim 6 wherein M in the general formula is at least one element selected from the group consisting of Y, Lu and Gd.

8. A radiographic phosphor screen as set forth in claim 6 wherein M is Lu.

9. A radiographic phosphor screen as set forth in claim 6 wherein $x$ in the general formula is a number of from 0.75 to 0.95.

10. A radiographic phosphor screen as set forth in claim 6 wherein the substrate is at least one member selected from the group consisting of plastic films, plastic film-coated papers, glass sheets, aluminum plates, beryllium plates and a combination of two or more of the foregoing materials.

11. An X-ray image converter comprising a substrate, a phospho-vanadate phosphor supported on said substrate, said phosphovanadate being represented by the following general formula:

$$M(P_x, V_{1-x})O_4$$

wherein M stands for at least one element selected from the group consisting of Y, La, Lu and Gd, and $x$ is a number of from 0.7 to 0.99, and an X-ray source.

12. An X-ray image converter as set forth in claim 11 wherein M in the general formula is at least one element selected from the group consisting of Y, Lu and Gd.

13. An X-ray image converter as set forth in claim 11 wherein $x$ in the general formula is a number of from 0.75 to 0.95.

14. An X-ray image converter comprising a substrate, a phospho-vanadate phosphor supported on said support, said phosphovanadate phosphor being represented by the following general formula:

$$M(P_x, V_{1-x})O_4$$

wherein M stands for at least one element selected from the group consisting of Y, La, Lu and Gd, and $x$ is a number of from 0.7 to 0.99, and being activated by 0.01 to 0.5 mole % of thulium as an activator, and an X-ray source.

15. An X-ray image converter as set forth in claim 14 wherein M in the general formula is at least one element selected from the group consisting of Y, Lu and Gd.

16. An X-ray image converter as set forth in claim 14 wherein $x$ in the general formula is a number of from 0.75 to 0.95.

17. A method for converting radioactive rays to visible rays comprising applying radioactive rays to a radiographic phosphor screen comprising a substrate and, supported thereon, a phospho-vanadate phosphor represented by the following general formula:

$$M(P_x, V_{1-x})O_4$$

wherein M stands for at least one member selected from the group consisting of Y, La, Lu and Gd, and $x$ is a number of from 0.7 to 0.99, to thereby convert the radioactive rays to visible rays.

18. A method according to claim 17 wherein M in the general formula is at least one element selected from the group consisting of Y, Lu and Gd.

19. A method according to claim 17 wherein the radioactive rays applied are radioactive rays having an energy of 0.01 to 10 MeV.

20. A method for converting radioactive rays to visible rays comprising applying radioactive rays to a radiographic phosphor screen comprising a substrate and, supported thereon, a phospho-vanadate phosphor represented by the following general formula:

$$M(P_x, V_{1-x})O_4$$

wherein M stands for at least one element selected from the group consisting of Y, La, Lu and Gd, and $x$ is a number of from 0.7 to 0.99, said phospho-vanadate phosphor being activated with 0.01 to 0.5 mole % of thulium as an activator, to thereby convert the radioactive rays to visible rays.

21. A method according to claim 20 wherein M in the general formula is at least one element selected from the group consisting of Y, Lu and Gd.

22. A method according to claim 22 wherein the radioactive rays applied are radioactive rays having an energy of 0.01 to 10 MeV.

* * * * *